O. J. CHUBBUCK.
GRAIN-SEPARATOR.
No. 186,230. Patented Jan. 16, 1877.
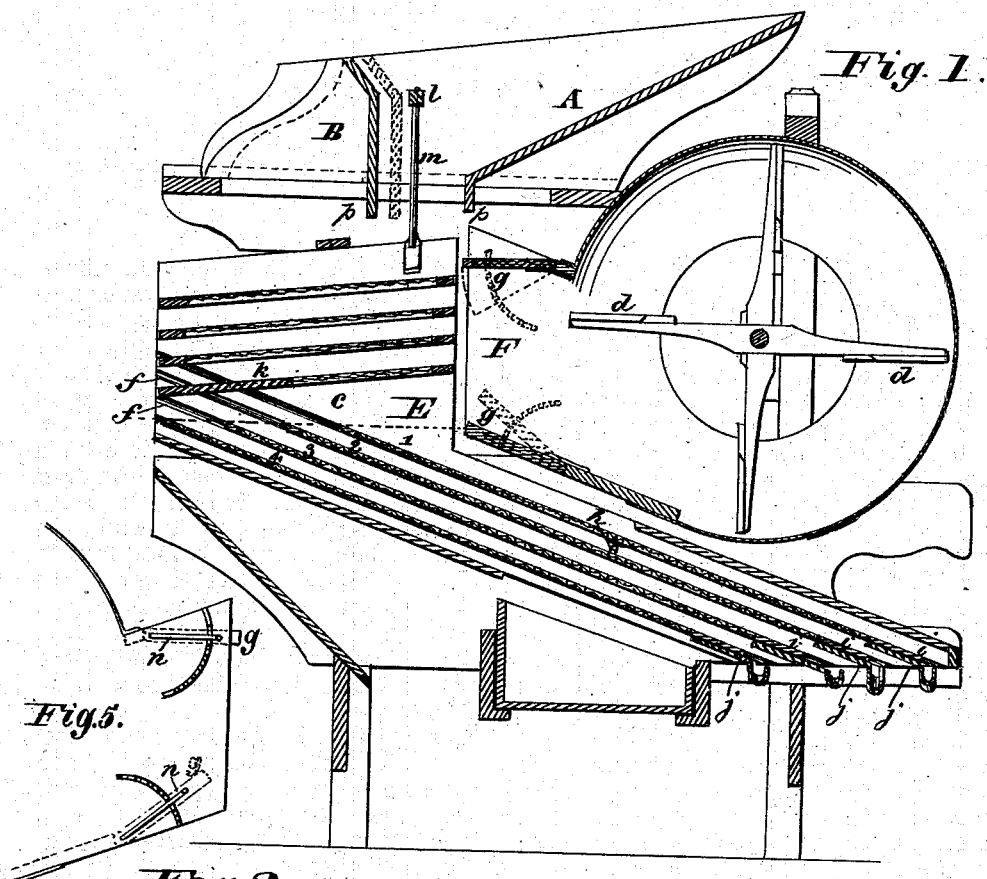
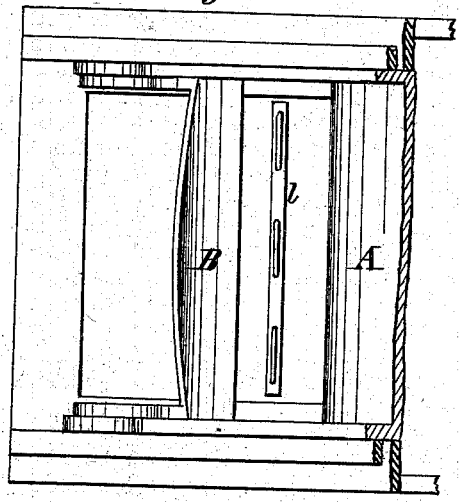
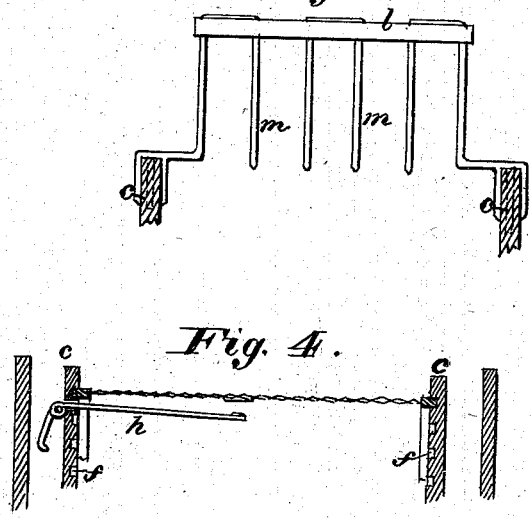
WITNESSES
Walter Allen
Le Blond Burdett
INVENTOR
O. J. Chubbuck
By Knight Bros Attorneys

UNITED STATES PATENT OFFICE.

OTIS J. CHUBBUCK, OF TOWANDA, PENNSYLVANIA.

IMPROVEMENT IN GRAIN-SEPARATORS.

Specification forming part of Letters Patent No. 186,230, dated January 16, 1877; application filed June 1, 1876.

*To all whom it may concern:*

Be it known that I, OTIS J. CHUBBUCK, of Towanda, in the county of Bradford and State of Pennsylvania, have invented certain new and useful Improvements in Fanning-Mills; and do hereby declare that the following is a full, clear, and exact description thereof, reference being had to the accompanying drawings, and to the letters of reference marked thereon, making part of these specifications, in which—

Figure 1 represents a longitudinal vertical section of my improved fanning-mill. Fig. 2 represents my extension-hopper. Fig. 3 represents the comb or rake, and Fig. 4 the striker or knocker used for clearing the screens of grain or seeds. Fig. 5 is a side elevation of the fan-case, showing the arms employed to operate the wind-deflectors.

My invention relates to fanning-mills or grain-separators; and consists, first, of an extension-hopper, composed mainly of two parts, the part A forming an incline plane, with sides resting upon the frame of the fanning-mill, and the part B forming the movable end of such hopper, so constructed as to fit closely between the sides $c\ c$, and movable at pleasure to regulate the flow of chaff or grain placed therein as it falls upon the screens below, the sides $p\ p$ of the throat or opening of the hopper below being parallel with each other, and vertical, or nearly so, or adjustable, so as to be inclined as desired to give direction to the grain, so as to cause it to flow in a continuous sheet most favorable to the influence of the blast of air from the fans $d\ d$, the whole being placed upon the frame of the fanning-mill at such point with reference to the screens below as may be desired; second, in the construction of the vibrating shoe E E and arrangement of long and short screens or boards therein, as shown in Fig. 1. The screens 1 2 3 4 in the long grooves $f\ f$ are placed in the shoe in such manner that their upper ends will be in horizontal line, or any one or more of them may be drawn upward along its grooves so as to catch such proportion of heavier or lighter grain as may be desired, the lower end $i$ of the long screens and their corresponding supports $j$ in the vibrating shoe being formed of thin boards or strips a few inches in width to allow of such change or adjustment without changing the direction or flow of the grain over them into the spouts attached to the shoe, which receive and deliver the grain or seeds from each screen separately at the rear of the mill. The upper ends of the long screens in the shoe occupy such position with reference to the fall of the grain or seeds from the hopper, driven by the blast of air from the fans, that the heavier grains fall upon the long screen No. 1, while the lighter grains, being blown farther from a vertical line let fall from the throat of the hopper, fall upon the long screen No. 2, while still lighter seeds, chess, rat-dirt, &c., are caused to fall upon a short fine screen or board, $k$, and are carried over the screen upon the floor, or screened and deposited in separate vessels, as may be desired. Thus chess, oats, and lighter grains or seeds, may be rapidly and easily separated from wheat, rye, or heavier grains, seed-grain be separated, the whole chaffed and screened by any desired combination of screens at one operation.

To cause the blast to act with best effect I employ two thin boards, $g\ g$, pivoted or hinged at one edge, placed one at the upper and one at the lower limit of the drum or wind-throat F, as shown in Fig. 1, which may be turned inward or toward each other, so as to regulate the direction and force of the blast from the fans $d\ d$. The arms $n$, Fig. 5, on the exterior of the fan-case, serve to adjust the boards $g\ g$ and to indicate their position; third, the construction and use of a comb or rake composed of a horizontal part, $l$, made of wood or metal, with teeth $m$, which, when in place, shall point downward, the whole to be attached to the upper part of the shoe and vibrated in the throat of the hopper by means of clips, as shown, or other equivalent means, so that it may be adjusted to proper position relatively to the vertical walls of the hopper to loosen the chaff and cause a uniform flood of the same from the hopper. I also employ knocker or striker made of wire $h$, with a looped elbow a short distance from one end, through which to pass a fastening to be attached to the side-board of the shoe, the long end to extend to the middle of the screen, the whole so hung that when the vibrating shoe nears the side-board of the mill the short end of the knocker shall strike the same and cause the long end to give the screen a quick sharp blow to dislodge kernels of grain thereon. As many of these may be used as may be found necessary to keep the screens clear. They also serve to break the force of the weight of the shoe and contents in its motion. The screens may be protected by attaching thereto a piece of leather or other substance, or the striker may be covered with leather.

The shoe is suspended, as represented in Fig. 1, by straps or otherwise. Spouts are attached to the lower end of the shoe to receive and deliver the grain from each screen except the lower, which delivers its grain into a box or draw under the mill, the shoe being boarded on the under side down to the box. The spouts are so placed as to deliver the grain at either side and center at the rear of the mill. The short screens for the upper grooves of the shoe are made of the same width and one-half of the length of the long screens, so that when desired they may be used in the long grooves. Boards are also provided. When it is desired to secure the heavier grain for seed a board of the size of the short screens may be put in the lower end of the upper long groove, and a short screen of proper mesh in the upper end. A board of one-fourth the length, also a screen of the same length, are provided to be used as wanted in the lower end of the short inclined grooves of the shoe.

The mill is operated in the usual manner by crank or driving wheel, which meshes into the pinion, which, by means of a connecting-rod and elbow, give a lateral vibration to the shoe. Other parts not herein described may be constructed in any approved manner.

I claim as my invention—

1. The extension-hopper constructed of two parts, A B, adjustable in their distance asunder, and having parallel descending walls, forming a vertical or nearly vertical delivery-throat of variable capacity.

2. A series of adjustable screens arranged with their upper edges to act as dividers in separating the grain into various grades by the action of the blast and gravity, as described, in combination with chutes $j\ j$ to conduct the grain to the appropriate places of delivery while permitting the adjustment of the screens, as set forth.

3. The combination of the hopper A B, parallel delivery-walls $p\ p$, shoe E, and rake $l\ m$, substantially as and for the purpose set forth.

O. J. CHUBBUCK.

Witnesses:
W. J. YOUNG,
J. WELLS.